United States Patent [19]

Starkovich et al.

[11] Patent Number: 5,655,757
[45] Date of Patent: Aug. 12, 1997

[54] ACTIVELY CONTROLLED DAMPER

[75] Inventors: John A. Starkovich, Redondo Beach, Calif.; Emil M. Shtarkman, Southfield, Mich.

[73] Assignee: TRW Inc., Lyndhurst, Ohio

[21] Appl. No.: 390,691

[22] Filed: Feb. 17, 1995

[51] Int. Cl.$^6$ .................................................. F16M 1/00
[52] U.S. Cl. .................................. 267/140.15; 188/267
[58] Field of Search ......................... 267/140.14, 140.15, 267/219; 248/550, 562, 566, 636, 638; 188/267, 268, 378–380; 244/2, 54, 63, 158 R

[56] References Cited

U.S. PATENT DOCUMENTS

| | | |
|---|---|---|
| 3,566,993 | 3/1971 | Leatherwood ............... 188/379 |
| 4,624,435 | 11/1986 | Freudenberg . |
| 4,759,534 | 7/1988 | Hartel . |
| 4,848,525 | 7/1989 | Jacot et al. ................. 188/378 |
| 4,893,800 | 1/1990 | Tabata ....................... 188/267 |
| 4,896,754 | 1/1990 | Carlson et al. . |
| 4,923,057 | 5/1990 | Carlson et al. ............. 188/378 |
| 5,125,338 | 6/1992 | Henson . |
| 5,176,368 | 1/1993 | Shtarkman ............... 267/140.14 |
| 5,244,170 | 9/1993 | Shekher ................... 244/158 R |
| 5,249,784 | 10/1993 | Murakami et al. . |
| 5,398,785 | 3/1995 | Leitmann et al. ........ 267/140.14 |
| 5,398,917 | 3/1995 | Carlson et al. .......... 267/140.14 |

FOREIGN PATENT DOCUMENTS

| | | | |
|---|---|---|---|
| 756107 | 8/1956 | Australia ................... 188/267 |
| 4233339 | 4/1994 | Germany . | |
| 0013930 | 1/1988 | Japan ......................... 188/267 |
| 0229935 | 9/1990 | Japan ......................... 188/267 |

Primary Examiner—Robert J. Oberleitner
Assistant Examiner—Chris Schwartz
Attorney, Agent, or Firm—Tarolli, Sundheim, Covell, Tummino & Szabo

[57] ABSTRACT

An apparatus (40) is connectable between relatively movable parts (12, 14) to resist relative vibration of the parts. The apparatus comprises a first ring-shaped member (50) having a first platform surface (54) engageable with one part (12). A second ring-shaped member (60) has a second platform surface (64) engageable with another part (14). One of the first and second ring-shaped members (50, 60) defines a series of sealed fluid chambers (48) located between the first and second members (50, 60) and spaced apart from each other around the first and second members. Each chamber (48) contains a fluid having a resistance to shear which varies in response to an energy field acting on the fluid. Each chamber (48) has its own respective blade member (42) connected to one of the first and second members (50, 60). The blade member (42) extends into the associated chamber (48). Each chamber (48) has its own respective pair of electromagnets (90, 92) for applying an energy field to the fluid in the chamber to vary the resistance to shear of the fluid as a function of the energy field acting thereon. The movement of the blade member (42) in the chamber (48) is resisted by the fluid.

17 Claims, 4 Drawing Sheets

ACTIVELY CONTROLLED DAMPER

BACKGROUND OF THE INVENTION

The present invention relates to an actively controlled damper which resists relative vibration of parts, and is particularly directed to an actively controlled damper which has a ring-shaped structure.

BACKGROUND ART

Many dampers for damping vibration between parts are known. Some dampers are of the active control type. Typically, in an actively controlled damper, the amount of damping varies as a function of a number of input signals indicative of different characteristics associated with the parts being damped.

SUMMARY OF THE INVENTION

In accordance with the present invention, an apparatus is connectable between relatively movable parts to resist relative vibration of the parts. The apparatus comprises a first ring-shaped member having a first platform surface engageable with one part. A second ring-shaped member has a second platform surface engageable with another part. One of the first and second ring-shaped members defines a sealed fluid chamber between the first and second ring-shaped members containing a fluid having a resistance to shear which varies in response to an energy field acting on the fluid. A blade member is connected to one of the first and second ring-shaped members and extends into the sealed fluid chamber. Means is provided for applying an energy field to the fluid in the sealed fluid chamber to vary the resistance to shear of the fluid as a function of the energy field acting thereon. The movement of the blade member in the sealed fluid chamber is resisted by the fluid to resist relative vibration of the first and second ring-shaped members and thereby to resist relative vibration of the parts.

Preferably, the means for applying an energy field to the fluid includes at least one energizeable electromagnetic coil for, when energized, providing a magnetic field having lines of magnetic flux passing through and acting on the fluid in the sealed fluid chamber. The fluid is, preferably, an rheological magnetic fluid. One of the relatively movable parts may be a rocket launch vehicle and another one of the parts may be a rocket payload to be carried by the rocket launch vehicle. The rocket launch vehicle would include an adapter interface fitting to which the platform surface of one of the first and second ring-shaped members would be engageable.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
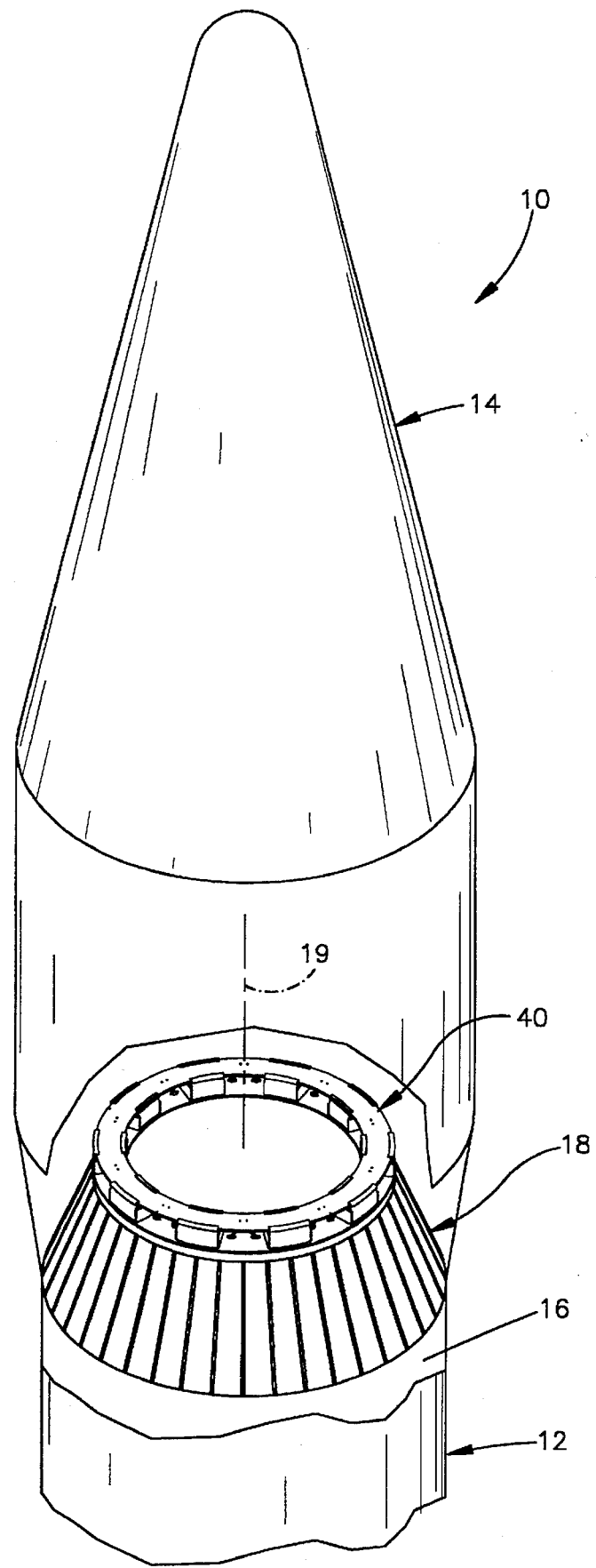
FIG. 1 is a schematic perspective view of a spacecraft system embodying an actively controlled damper constructed in accordance with the present invention.

The present invention relates to an actively controlled damper which resists relative vibration of parts. The specific application in which the actively controlled damper is used may vary. By way of example, as illustrated in FIG. 1, an actively controlled damper constructed in accordance with the present invention is embodied in a spacecraft system 10.

The spacecraft system 10 comprises a rocket launch vehicle 12 and a rocket payload 14 to be carried by the launch vehicle 12 into space. The launch vehicle 12 has a generally cylindrical cross section having a top end 16 and a bottom end (not shown). A payload adapter fitting 18 is fixedly mounted on the top end 16 of the launch vehicle 12 in a known manner. The launch vehicle 12, the rocket payload 14, and the payload adapter fitting 18 lie along a longitudinal axis 19.

Figure 2:
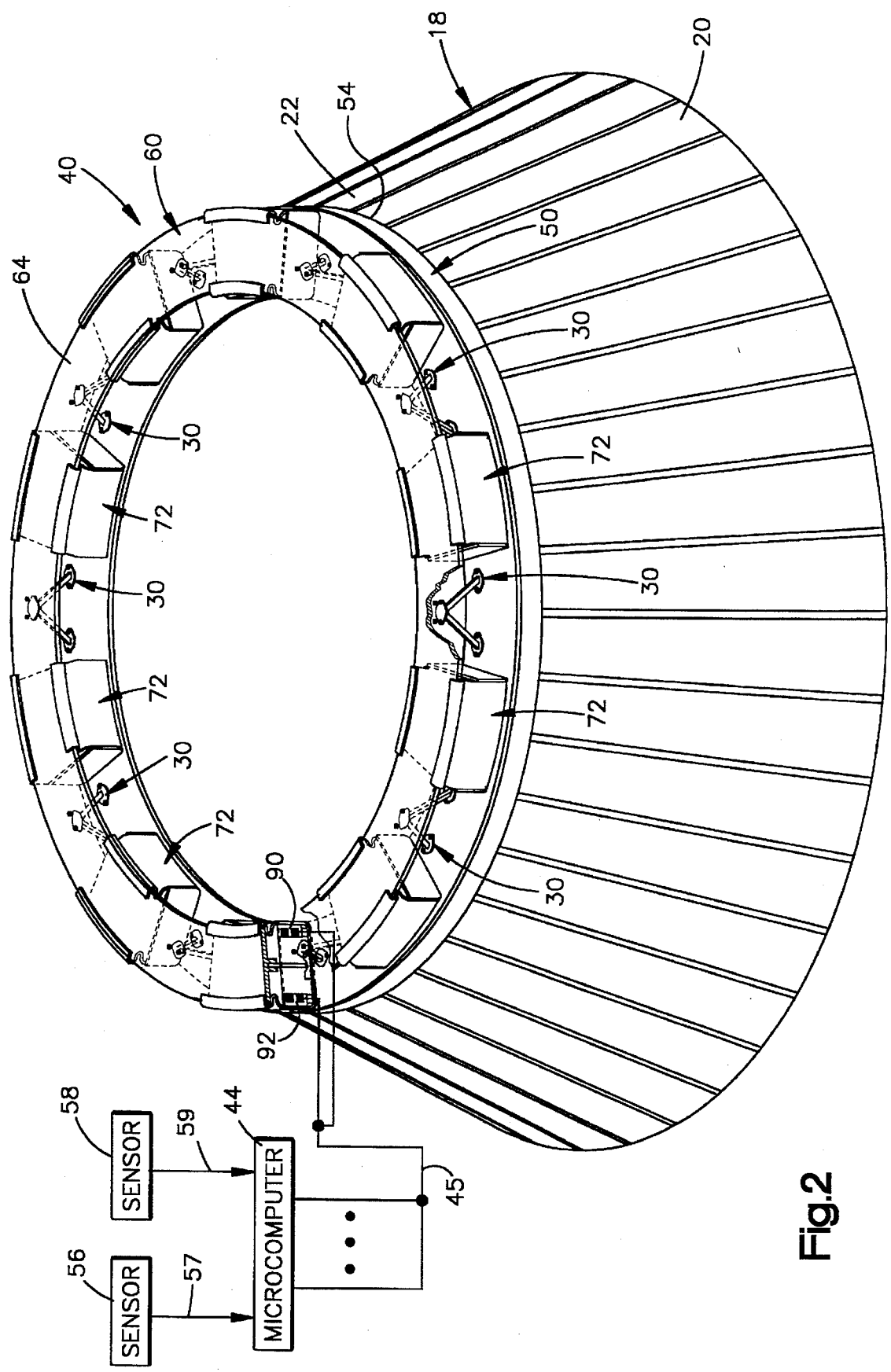
FIG. 2 is an enlarged view of the actively controlled damper of FIG. 1.

Referring to FIG. 2, the payload adapter fitting 18 has the shape of a cone section having opposite circular ends 20, 22. The circular end 20 has a larger diameter than the diameter of the other circular end 22. The top end 16 of the launch vehicle 12 is fixedly connected to the circular end 20 of the payload adapter fitting 18.

Figure 3:
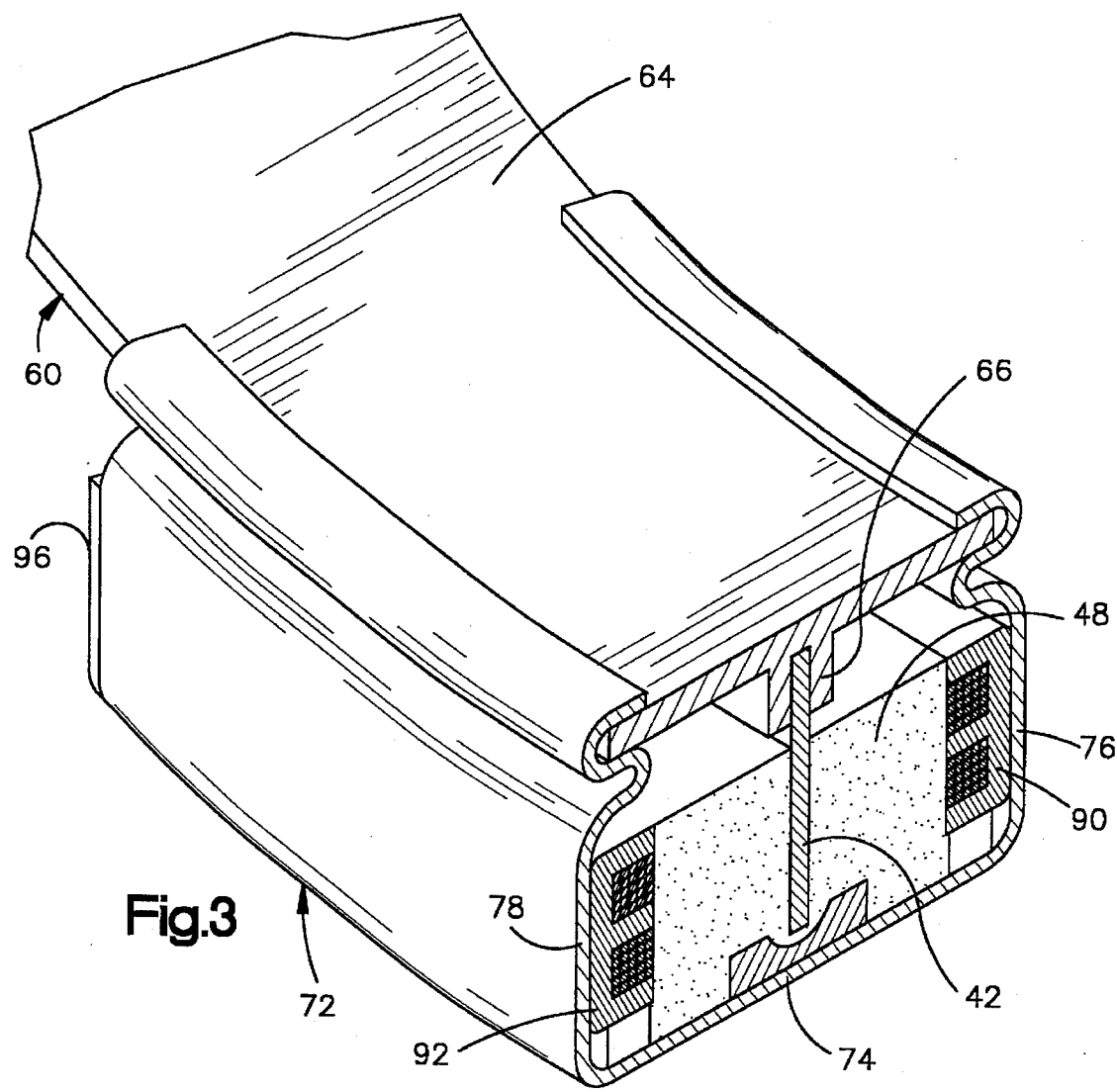
FIG. 3 is an enlarged view of a portion of FIG. 2 and showing certain parts removed.
Figure 5:
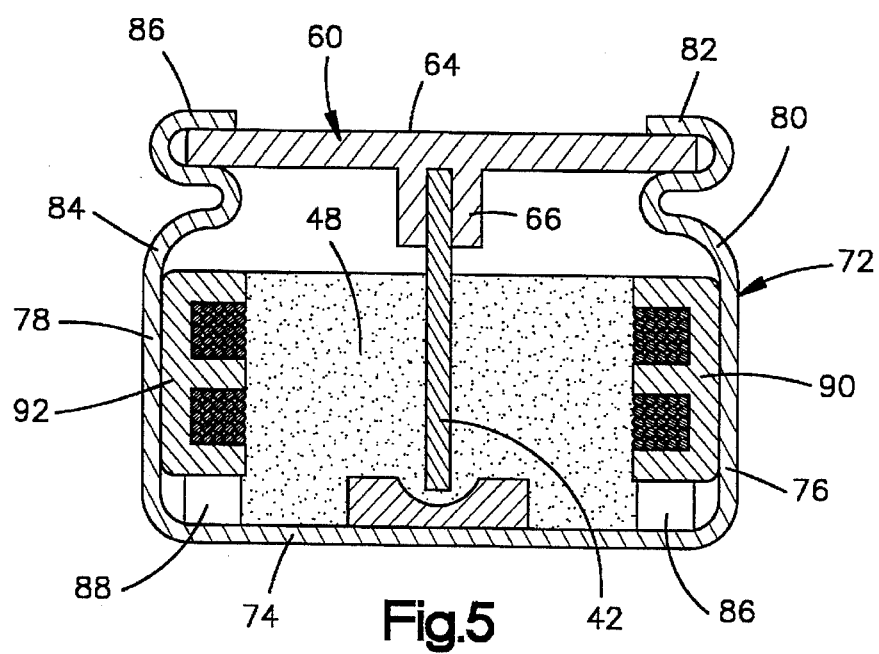
FIG. 5 is a sectional view taken approximately along line 5—5 in FIG. 4.

Referring to FIGS. 1 and 2, an actively controlled damper 40 lies along the longitudinal axis 19 and is operatively connected between the circular end 22 of the payload adapter fitting 18 and the payload 14. The damper 40 includes a first ring-shaped member 50 having a first platform surface 54 engaged with the circular end 22 of the payload adapter fitting 18. The damper 40 also includes a second ring-shaped member 60 having a second platform surface 64 engaged with the rocket payload 14. The second ring-shaped member 60 has a series of flange portions 66 (only one shown in FIGS. 3 and 5) which project in a downward direction. The flange portions 66 are spaced equally apart from each other around the second ring-shaped member 60.

A series of enclosure members 72 is disposed between and around the periphery of the first and second ring-shaped members 50, 60. The enclosure members 72 are spaced equally apart from each other around the first and second ring-shaped members 50, 60. The construction of each of the enclosure members 72 is the same. For simplicity, only the one enclosure member 72 with reference to FIGS. 3 and 5 will be described in detail.

The enclosure member 72 is constructed of a magnetic material. Two generally arcuate-shaped electromagnets 90, 92 are disposed on opposite sides of the enclosure member 72. The enclosure member 72 includes a bottom wall 74 and a pair of side walls 76, 78 extending away from the bottom wall 74.

A spacer 86 made of a suitable material is disposed between the electromagnet 90 and the bottom wall 74 of the enclosure member 72. The side wall 76 has a first portion 80 (FIG. 5) crimped over the electromagnet 90 to secure the electromagnet 90 in place. The side wall 76 also has a second portion 82 which is crimped over the second platform surface 64 of the second ring-shaped member 60. The crimped first and second portions 80, 82 of the side wall 76 have resilience and act like a spring connected between the second platform surface 64 and the electromagnet 90. A pair of wire ends (not shown) extend from the coil of the electromagnet 90 for receiving an electrical signal.

Similarly, a spacer 88 made of a suitable material is disposed between the electromagnet 92 and the bottom wall 74 of the enclosure member 72. The side wall 78 has a first portion 84 crimped over the electromagnet 92 to secure the electromagnet 92 in place. The side wall 78 also has a second portion 86 which is crimped over the second platform surface 64. The crimped first and second portions 84, 86 of the side wall 78 have resilience and act like a spring connected between the second platform surface 64 and the electromagnet 92. A pair of wire ends (not shown) extend from the coil of the electromagnet 92 for receiving an electrical signal.

Figure 4:
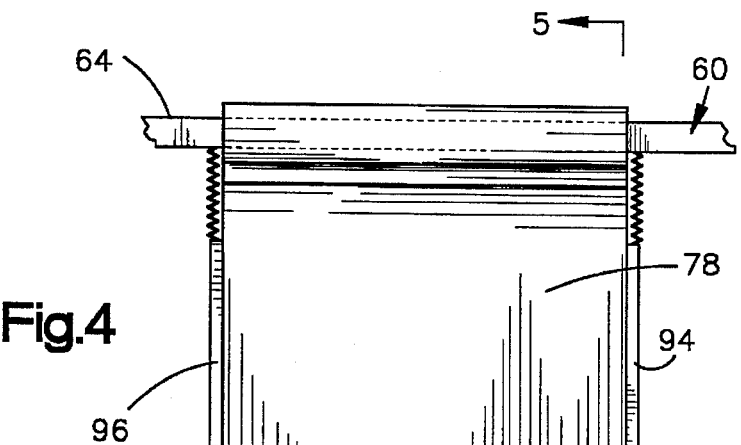
FIG. 4 is an enlarged elevational view of a portion of FIG. 2.

A flexible end wall 94 (shown only in FIG. 4) in the form of a bellows is secured to the second ring-shaped member 60 and to one end of the side walls 76, 78 and the bottom wall 74 to provide a fluid-tight seal between inside the enclosure member 72 and outside the enclosure member. Similarly, another flexible end wall 96 (FIGS. 3 and 4), also in the form of a bellows, is secured to the second ring-shaped member 60 and to the other end of the side walls 76, 78 and the bottom wall 74 to also provide a fluid-tight seal between inside the enclosure member 72 and outside the enclosure member.

The electromagnet 90 is secured to the enclosure member 72 by being clamped between the spacer 86 and the crimped first portion 80 of the side wall 76. Similarly, the electromagnet 92 is secured to the enclosure member 72 by being clamped between the spacer 88 and the crimped first portion 84 of the side wall 78. The electromagnets 90, 92 could, alternatively, be chemically bonded to the side walls 76, 78 of the enclosure member 72.

The second ring-shaped member 60, the two flexible end walls 94, 96, and the enclosure member 72 define a sealed fluid chamber 48 which is curved about the longitudinal axis 19. The sealed fluid chamber 48 contains an energy responsive fluid having a resistance to shear which varies in response to an energy field acting on the fluid. Preferably, the energy responsive fluid is an rheological magnetic fluid. The magnetic material of the enclosure member 72 allows maximum passage of magnetic flux from the electromagnets 90, 92 to act on the fluid in the sealed fluid chamber 48.

The sealed fluid chamber 48 has its own blade member 42 having one end fixedly connected to a respective one of the flange portions 66 of the second ring-shaped member 60. Preferably, the one end of the blade member 42 is insert molded into the flange portion 66 of the second ring-shaped member 60. The other end of the blade member 42 extends into the electrorheological magnetic fluid in the sealed fluid chamber 48. The blade member 42 is also curved about the longitudinal axis 19.

Figure 6:
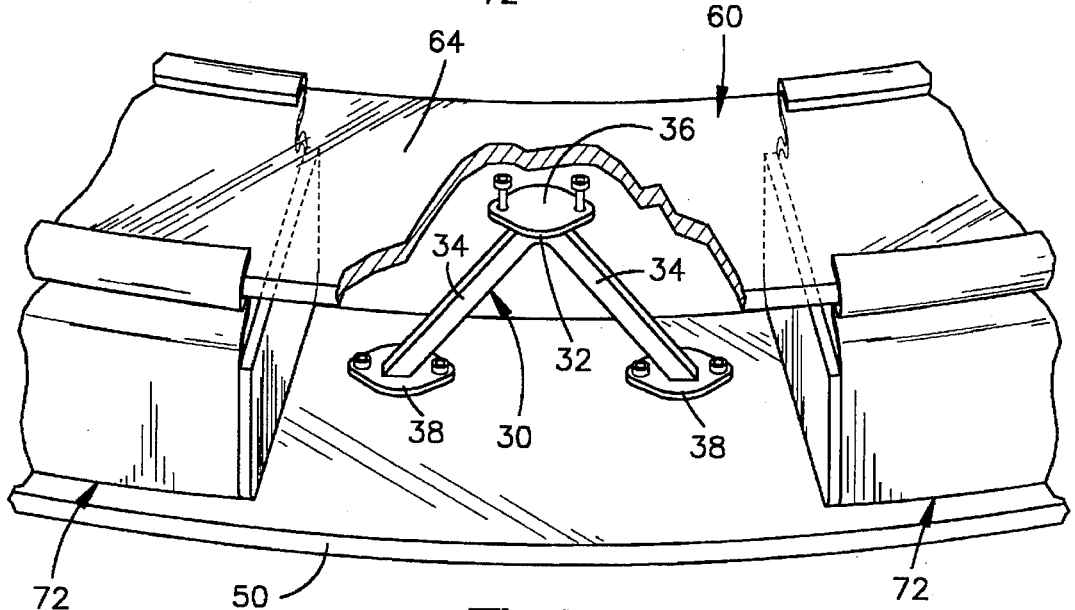
FIG. 6 is an enlarged view of another portion of FIG. 2.

A series of load springs 30 (FIG. 2) disposed between and around the first and second ring-shaped members 50, 60. The load springs 30 are spaced equally apart from each other around the first and second ring-shaped members 50, 60. The load springs 30 are disposed alternately between the series of sealed fluid chambers 48. The structure and operation of each of the load springs 30 are the same. For simplicity, only the one load spring 30 with reference to FIG. 6 will be described in detail.

The load spring 30 includes a main stem portion 32 and two leg portions 34 which extend away from the main stem portion 32. The free end of the main stem portion 32 has a flange 36 which is fastened to the second ring-shaped member 60 using suitable fasteners. The free end of each of the leg portions 34 has a flange 38 which is fastened to the first ring-shaped member 50 using suitable fasteners.

The load spring 30 acts as a load carrying and connecting element between the first and second ring-shaped members 50, 60.

Referring again to FIG. 2, a microcomputer 44 monitors output signals from a number of remote sensors 56, 58 and generates control signals in accordance with preprogrammed procedures stored in an internal memory of the microcomputer 44. Microcomputers are readily available in the commercial market. Their internal structure and operation are well known in the art and, therefore, will not be described in detail herein.

The output signals from the remote sensors 56, 58 may be indicative of conditions, such as acceleration of the launch vehicle 12. For example, the remote sensor 56 may be an accelerometer mounted on the launch vehicle 12 and the remote sensor 58 may be an accelerometer 58 mounted on the payload 14. The accelerometer 56 provides an output signal on line 57, and the accelerometer 58 provides an output signal on line 59. In response to the output signals on line 57, 59 from the accelerometers 56, 58, the microcomputer 44 generates the control signals on lines 45 which are applied to the coils of the electromagnets 90, 92 to control the voltages applied to the coils of the electromagnets 90, 92.

When the coils of the electromagnets 90, 92 are energized, each coil generates its own magnetic field which interacts with the magnetic field of the other coil. The interaction between the magnetic fields is such that lines of magnetic flux established between the two coils of the electromagnets 90, 92 pass through the fluid in the sealed fluid chamber 48. These lines of magnetic flux act on the fluid in the sealed fluid chamber 48 to vary the resistance to shear of the fluid.

When vibrations occur between the launch vehicle 12 and the payload 14, the first and second ring-shaped members 50, 60 move axially and/or laterally relative to each other. Due to the resilience of the crimped first and second portions 80, 82 of the side wall 76 and the resilience of the crimped first and second portions 84, 86 of the side wall 78, the blade member 42 moves within the sealed fluid chamber 48 relative to the electromagnets 90, 92 and thus relative to the side walls 76, 78. This relative movement is damped by the shear resistance of the fluid in the sealed fluid chamber 48. Since the movement of the blade member 42 is damped, vibrations between the first and second ring-shaped members 50, 60 and thus between the launch vehicle 12 and the payload 14 are damped.

The resistance to shear of the fluid varies as a function of the voltages applied to the coils of the electromagnets 90, 92. The resistance to movement of the blade member 42 within the sealed fluid chamber 48 varies as a function of the shear resistance of the fluid. The resistance to vibrational movements of the launch vehicle 12 and the payload 14 depends upon the resistance to movement of the blade member 42 within the sealed fluid chamber 48. Thus, by varying the voltages applied to the coils of the electromagnets 90, 92, the resistance to vibrational movements of the launch vehicle 12 and the payload 14, and hence the damping rate of the damper 40, is varied.

It should be apparent that the damper 40 is capable of a range of controlled damping rates and is not limited to a fixed damping rate. The damper 40 damps axial and/or lateral vibrational movements of the launch vehicle 12 and the payload 14 resulting from roll, pitch, axial movement and/or yaw of the payload 14 relative to the launch vehicle 12.

It is contemplated that permanent magnets or a combination of permanent magnets and electromagnets could be used in place of the pair of electromagnets 90, 92 described hereinabove. The permanent magnets or the combination of permanent magnets and electromagnets may be connected in a series configuration or a parallel configuration. It is also contemplated that the damper 40 may be used in other applications for damping axial and/or lateral vibrational movements of parts. For example, the damper 40 may be used to damp vibrational movements of cargo loads, automobile bodies, automobile engines, truck and tractor cabs, heavy machinery, torsion couplers, clutches, transmissions, and universal bearings.

Figure 7:
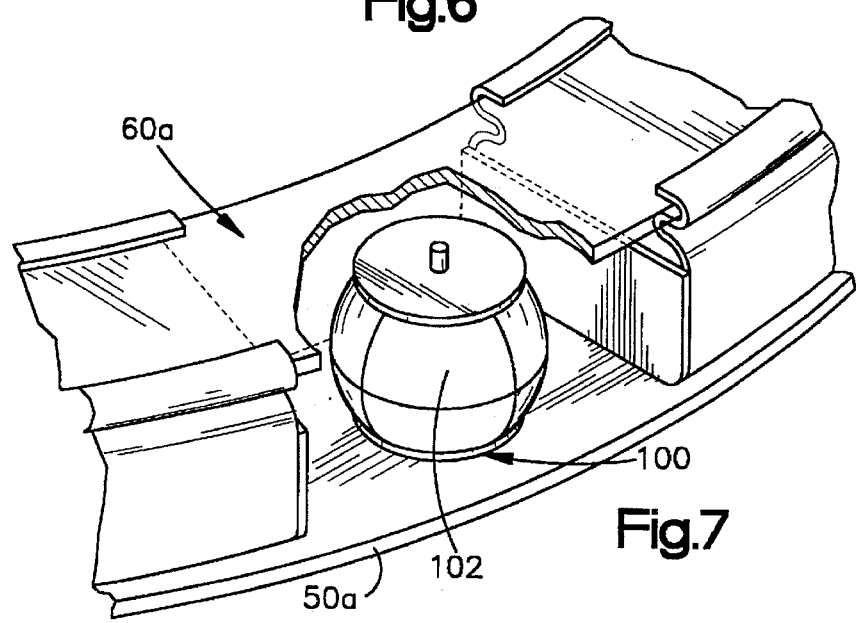
FIG. 7 is a view similar to FIG. 6 and showing another embodiment of the present invention.

Another embodiment of the present invention is shown in FIG. 7. Since the embodiment of the invention shown in FIG. 7 is generally similar to the embodiment of the invention shown in FIGS. 1–6, similar numerals will be utilized to designate similar components, the suffix letter "a" being associated with the components of FIG. 7 to avoid confusion.

The arrangement of components in the embodiment shown in FIG. 7 is the same as that shown in FIGS. 1–6, except that a series of controllable load springs 100 are used in place of the series of load springs 30 in the embodiment shown in FIGS. 1–6.

The structure of each of the controllable load springs 100 is similar. For simplicity, only the controllable load spring 100 with reference to FIG. 7 is described in detail. As shown in FIG. 7, the controllable load spring 100 includes an elastomeric air spring 102 which is connected between the first and second ring-shaped members 50a, 60a. The elastomeric air spring 102 is of conventional design. Typically, the air spring 102 has an internal gas chamber (not shown) filled with gas. The pressure of the gas of the air spring 102 may be actively controlled by the microcomputer (not shown) to act as a levelling device, for example. Since the structure and operation of active air springs are generally well known, they will not be described herein.

From the above description of the invention, those skilled in the art to which the present invention relates will perceive improvements, changes and modifications. Such improvements, changes and modifications within the skill of the art are intended to be covered by the appended claims.

Having described the invention, the following is claimed:

1. An apparatus connectable between relatively movable parts to resist relative vibration of the parts along an axis, said apparatus comprising:

a first ring-shaped member having a first platform surface engageable with one part;

a second ring-shaped member having a second platform surface engageable with another part;

at least one enclosure member disposed between said first and second ring-shaped members, said at least one enclosure member having a first end and a second end;

a first radially extending end wall connected to one of said first and second ring-shaped members and to said first end of said at least one enclosure member;

a second radially extending end wall connected to one of said first and second ring-shaped members and to said second end of said at least one enclosure member;

a portion of one of said first and second ring-shaped members, said first and second radially extending end walls, and said at least one enclosure member defining a sealed fluid chamber between said first and second ring-shaped members and which is curved about the axis, said sealed fluid chamber containing a fluid having a resistance to shear which varies in response to an energy field acting on the fluid;

a blade member connected to one of said first and second ring-shaped members and extending into said sealed fluid chamber, said blade member being curved about the axis; and means for applying an energy field to the fluid in said sealed fluid chamber to vary the resistance to shear of the fluid as a function of the energy field acting thereon, the movement of said blade member in said sealed fluid chamber being resisted by the fluid to resist relative vibration of said first and second ring-shaped members and thereby to resist vibration of the parts.

2. An apparatus according to claim 1 further comprising at least one load spring connected directly to said first and second ring-shaped members to resist (i) relative axial movement of said first and second ring-shaped members and/or (ii) relative lateral movement of said first and second ring-shaped members.

3. An apparatus according to claim 2 wherein said at least one load carrying spring is V-shaped and includes a main stem portion and two leg portions which extend away from said main stem portion, said main stem portion having a flange which is fastened to said second ring-shaped member, each of said two leg portions having a flange which is fastened to said first ring-shaped member.

4. An apparatus according to claim 2 wherein said at least one load carrying spring comprises an elastomeric load spring having an internal gas chamber filled with a gas, the pressure of said gas being actively controllable.

5. An apparatus according to claim 1 wherein said means for applying an energy field to the fluid includes at least one energizeable electromagnetic coil for, when energized, providing a magnetic field having lines of magnetic flux passing through and acting on the fluid in said sealed fluid chamber.

6. An apparatus according to claim 1 wherein the fluid is a rheological magnetic fluid.

7. An apparatus according to claim 1 wherein (i) one of the relatively movable parts is a rocket launch vehicle and another one of the parts is a rocket payload to be carried by the rocket launch vehicle and (ii) the rocket launch vehicle includes an adapter interface fitting to which the platform surface of one of said first and second ring-shaped members is engageable.

8. An apparatus connectable between relatively movable parts to resist relative vibration of the parts along an axis, said apparatus comprising:

a first ring-shaped member having a first platform surface engageable with one part;

a second ring-shaped member having a second platform surface engageable with another part; and a series of enclosure members disposed between said first and second ring-shaped members and spaced circumferentially apart from each other, each of said series of enclosure members and one of said first and second ring-shaped members in part defining a sealed fluid chamber which is curved about the axis and contains a fluid, said fluid having a resistance to shear which varies in response to an energy field acting on the fluid;

each of said sealed fluid chambers having its own respective blade member connected to one of said first and second ring-shaped members and extending into the associated sealed fluid chamber, each of said blade members being curved about the axis;

each of said sealed fluid chambers having its own respective means for applying an energy field to the fluid in the associated sealed fluid chamber to vary the resistance to shear of the fluid as a function of the energy field acting thereon, the movement of the associated blade member in the associated sealed fluid chamber being resisted by the fluid to resist relative vibration of said first and second ring-shaped members and thereby to resist relative vibration of the parts.

9. An apparatus according to claim 8 further comprising a series of load springs connected directly to said first and second ring-shaped members and disposed alternately between each of said series of enclosure members to resist relative axial movement of said first and second ring-shaped members.

10. An apparatus according to claim 9 wherein said at least one load carrying spring is V-shaped and includes a main stem portion and two leg portions which extend away from said main stem portion, said main stem portion having a flange which is fastened to said second ring-shaped member, each of said two leg portions having a flange which is fastened to said first ring-shaped member.

11. An apparatus according to claim 9 wherein said at least one load carrying spring comprises an elastomeric load spring having an internal gas chamber filled with a gas, the pressure of said gas being actively controllable.

12. An apparatus according to claim 8 wherein the fluid is a rheological magnetic fluid.

13. An apparatus according to claim 8 wherein (i) one of the relatively movable parts is a rocket launch vehicle and another one of the parts is a rocket payload to be carried by the rocket launch vehicle and (ii) the rocket launch vehicle includes an adapter interface fitting to which the platform surface of one of said first and second ring-shaped members is engageable.

14. An apparatus comprising:

a rocket launch vehicle including an adapter interface fitting;

a first ring-shaped member having a first platform surface engaged with said adapter interface fitting of said rocket launch vehicle;

a rocket payload carried by said adapter interface fitting of said rocket launch vehicle;

a second ring-shaped member having a second platform engaged with said rocket payload;

a sealed fluid chamber defined in part by one of said first and second ring-shaped members disposed between said first and second ring-shaped members, said sealed fluid chamber containing a fluid having a resistance to shear which varies in response to an energy field acting on the fluid;

a blade member connected to one of said first and second ring-shaped members and extending into said sealed fluid chamber; and means for applying an energy field to the fluid in said sealed fluid chamber to vary the resistance to shear of the fluid as a function of the energy field acting thereon, the movement of said blade member in said sealed fluid chamber being resisted by the fluid to resist relative vibration of said rocket payload and said rocket launch vehicle.

15. An apparatus according to claim 14 wherein said means for applying an energy field to the fluid includes at least one energizeable electromagnetic coil for, when energized, providing a magnetic field having lines of magnetic flux passing through and acting on the fluid in said sealed fluid chamber.

16. An apparatus according to claim 15 wherein the fluid is an rheological magnetic fluid.

17. An apparatus according to claim 14 further comprising at least one load carrying spring connected between said rocket payload and said adapter interface fitting of said rocket launch vehicle to resist relative movement of said rocket payload and said adapter interface fitting of said rocket launch vehicle.

* * * * *